Nov. 27, 1923. 1,475,836

C. A. KELLOGG

SPRING CRANK HOLDER FOR AUTOMOBILES

Filed Sept. 29, 1922

Inventor
Charles A. Kellogg
by Hazard & Miller
ATTYS

Patented Nov. 27, 1923.

1,475,836

UNITED STATES PATENT OFFICE.

CHARLES A. KELLOGG, OF LOS ANGELES, CALIFORNIA.

SPRING CRANK HOLDER FOR AUTOMOBILES.

Application filed September 29, 1922. Serial No. 591,304.

*To all whom it may concern:*

Be it known that I, CHARLES A. KELLOGG, a citizen of the United States, residing at Los Angeles, in the county of Los Angeles and State of California, have invented new and useful Improvements in Spring Crank Holders for Automobiles, of which the following is a specification.

This invention relates to means for holding the starting cranks of some type of motor vehicles, and it is an object of the present invention to provide an extremely simple, practical, inexpensive and readily applied resilient holder. It is another object to provide a crank holder that may be attached to a contiguous part of the vehicle and which will have its operating end extending into a convenient position to be applied to the crank to be held.

Other objects and advantages will be made manifest in the specification of an embodiment of the invention illustrated in the accompanying drawings, wherein—

Figure 1:
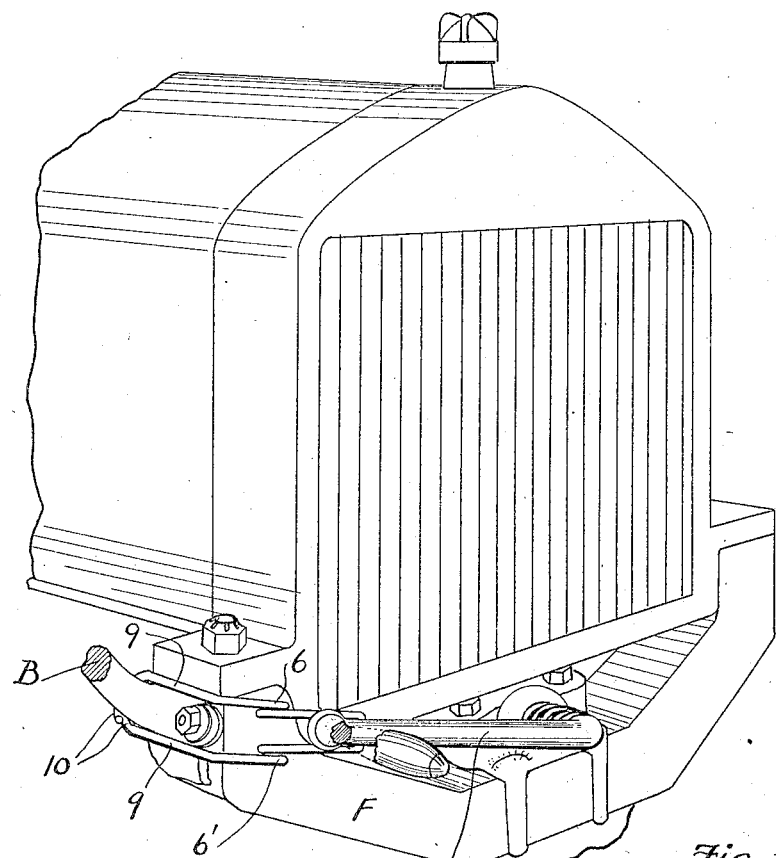
Figure 1 is a perspective of the front end of a road vehicle showing the device applied and holding the starting crank of the vehicle.

A popular type of road vehicle is provided with a starting crank 2, which, when free, hangs down in front of the frame and is free to rattle, with the production of an annoying rattling noise.

The device of the present invention is built preferably of one continuous piece of resilient wire, a length of which is folded medially to provide substantially parallel side shanks 4 and 4', the outer ends of which are cross-connected by a bowed portion 5. The other ends of the shanks 4 are coiled into spring eyes 6 and 6', from which extend tangential shanks 7, approximately parallel. The shanks are bent at right angles at 8 to form hook bars 9 having inwardly turned hook ends 10.

Figure 2:
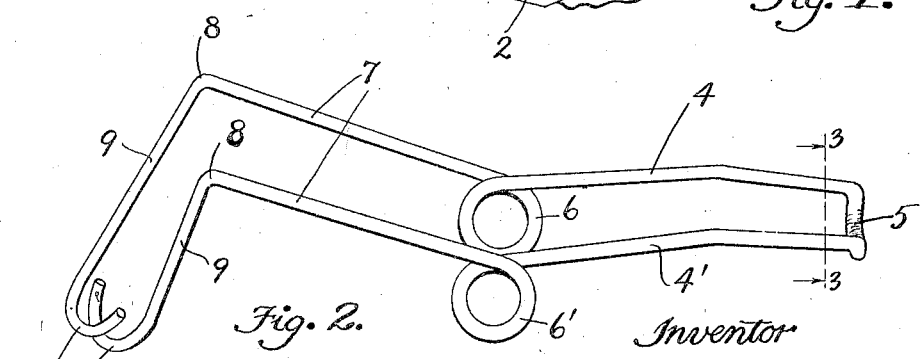
Figure 2 is a perspective of a dismounted crank holder.
Figure 3:
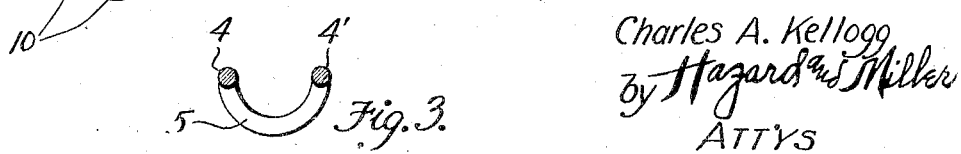
Figure 3 is a cross section on line 3—3 of Fig. 2.

The shanks 7 are bent up from the plane of the shanks 4—4, as clearly shown in Fig. 2. The device is applied by snapping the hooks 10 around behind the headlight bracket B of the vehicle so that the spring eyes 6—6' bear against the front cross frame member F. When in this position the bowed connecting bar 5 is thrown forwardly. To latch or hold the crank 2 against vibration and rattling it is swung around to the position shown in Fig. 2 and the receiving bow 5 is pressed back and then released to engage the crank 2.

Thus, when the retaining bow 5 is released it will be sprung out by the spring elements to firmly hold the crank in position.

Further embodiments, modifications and variations may be resorted to within the spirit of the invention as claimed.

What is claimed is:

1. A crank-holding device consisting of resilient side bars having rearwardly bent ends with hooks adapted to grapple about a bracket element of an automobile and having forwardly sprung shanks with a crank-receiving end portion.

2. A crank-holding device consisting of resilient side bars having rearwardly bent ends with hooks adapted to grapple about a bracket element of an automobile, and having forwardly sprung shanks with a crank-receiving end portion, said portion including a closed bight with a concaved, crank-receiving, transverse seat.

3. In combination with a vehicle having a starting crank and a lamp bracket, a crank-holding device consisting of resilient side bars having rearwardly bent ends with hooks to grapple with the said bracket, and having forwardly sprung shanks with a crank-receiving end portion.

4. In combination with a vehicle having a starting crank and a lamp bracket, a crank-holding device consisting of resilient side bars having rearwardly bent ends with hooks to grapple with the said bracket, and having forwardly sprung shanks with a crank-receiving end portion, the said forwardly sprung shanks when being repressed against the contiguous frame reacting therefrom to hold the crank.

In testimony whereof I have signed my name to this specification.

CHAS. A. KELLOGG.